United States Patent Office 3,256,359

Patented June 14, 1966

3,256,359

METHOD FOR THE POLYMERIZATION OF MONOOLEFINS

Stephen M. Kovach, Highland, Ind., assignor, by mesne assignments, to Sinclair Research, Inc., New York, N.Y., a corporation of Delaware No Drawing. Filed May 11, 1961, Ser. No. 109,241
5 Claims. (Cl. 260—683.15)

This invention relates to an improved method for the polymerization of lower monoolefin hydrocarbons.

It is conventional in the art to polymerize monoolefin hydrocarbons by passing them into contact with solid acidic polymerization catalysts under elevated conditions of temperature and pressure. For example, propylene, butylenes and mixtures of propylene and one or more of the butylenes have been polymerized with such catalysts. The monoolefin hydrocarbons have been used in pure form or in admixture with saturated paraffin hydrocarbons of approximately the same boiling point. Among the solid acidic catalysts which have been used or proposed are solid phosphoric acid, copper pyrophosphate, silica-alumina, alumina-boria, silica-boria and so forth. Pressures within the broad range from approximately 200 to 1200 p.s.i.g. have been used along with inlet temperatures within the broad range from approximately 280 to 475° F. To prevent undue temperature rise caused by the exothermic nature of the reaction, saturated hydrocarbons of approximately the same boiling point as the hydrocarbons being polymerized have been introduced into the reaction zone or, in some instances, cooling water has been passed in indirect heat-exchange with the reaction mixture for the same purpose.

In the polymerization of propylene, tridecene (a mixture of approximately 3 moles of propylene tetramer and one mole of propylene pentamer) is a particularly valuable product, for example for use in the manufacture of synthetic detergents. Also, in the polymerization of mixtures of propylene and one or more butylenes, heptenes are particularly valuable products, being useful in the manufacture of isooctyl alcohols.

The use of relatively low pressures has certain advantage in carrying out the polymerization operation. Thus, studies have shown that, in the polymerization of propylene, low pressures of approximately 100 to 400 p.s.i.g. increased the yield of tridecene and that, in the polymerization of mixtures of propylene and one or more butylenes, low pressures within the aforementioned range increase the yield of heptenes. However, the use of low pressures results in low catalyst activity. The purpose of this invention is to provide a method whereby low polymerization pressures within the aforementioned range can be employed, and the advantages of low pressure operations realized, while at the same time maintaining high catalyst activity.

This is accomplished by supplying to the reaction zone an inert organic liquid (one which does not undergo cracking, polymerization, alkylation or other reaction under the reaction conditions) which remains at least partially in liquid phase under the reaction conditions and is a solvent for polymers formed as a result of the polymerization reaction taking place. The effect of operating in this manner is that the inert liquid, by contacting the catalyst, cleanses the catalyst surface of polymer, thereby diminishing the formation of tars and coke which destroy catalyst activity. A wide variety of inert organic liquids can be used for the purpose of this invention, particularly liquids which are essentially saturated hydrocarbons, for example, $C_{16}$ and higher paraffins (hexadecane, octadecane, eicosane, straight-run gas oils, paraffin waxes, refined lubricating oils and so forth), decahydronaphthalene, and the like. The preferred organic liquid is a paraffin hydrocarbon having from 16 to 20 carbon atoms. Other inert organic liquids which are useful are nitrobenzene and high-boiling chlorinated aromatic compounds, such as ortho-dichlorobenzene.

In practicing the present invention, the feed can be of the type which has heretofore been used in propylene and butylene polymerization. For example, it can be propylene, a butylene, a mixture of butylenes, or a mixture of propylene and one or more butylenes. If desired, these olefins can be in admixture with paraffin hydrocarbons of similar boiling range, generally in amounts such that the monoolefin hydrocarbon or hydrocarbons are as low as 10 percent by weight of the mixture. Reaction temperatures generally within the range from 300 to 450° F. are suitable, although somewhat lower and somewhat higher reaction temperatures can be used. Likewise, the amount of inert organic liquid introduced into the reaction zone for the purpose of improving catalyst activity can be varied considerably, generally being within the range from 10 to 200 percent by weight, based upon the weight of the monoolefin hydrocarbon feed to the reaction zone.

The runs set forth in Table I either illustrate the invention or are included to provide comparative data. In the runs, the catalyst used was a UOP solid phosphoric acid catalyst (phosphoric acid on kieselguhr) of the kind widely used for the purpose of polymerizing olefins to form polymer gasoline. In each of the runs, propylene in vapor form was passed into contact with a bed of the catalyst at the inlet temperature and pressure shown. Table I also gives the liquid hourly space velocity (L.H.S.V., meaning volumes of propylene measured as liquid per volume of catalyst per hour). In runs 2 and 5, where cetane was used as the inert organic liquid, the amount of cetane introduced into the reaction zone into contact with the catalyst was 100 percent by weight based upon the weight of the propylene introduced. A comparison of runs 1 and 2 shows the improvement in conversion realized by the use of the cetane.

*Table I*

[Catalyst: UOP phosphoric acid on keiselguhr]

| Run | 1 | 2 | 3 | 4 | 5 |
|---|---|---|---|---|---|
| Conditions: | | | | | |
| Temperature, °F | 350 | 350 | 400 | 400 | 400 |
| Pressure, p.s.i.g | 300 | 300 | 600 | 150 | 200 |
| LHSV | 1 | 1 | 1 | 1 | 1 |
| Diluent | None | Cetane | None | None | Cetane |
| $C_3$=Conversion | 31 | 58 | 67 | 30 | 58 |
| Wt. Percent Product: | | | | | |
| Initial to 400° F. boiling point | 72 | 87 | 80 | 72 | 80 |
| 400° F.+boiling point | 28 | 13 | 20 | 28 | 20 |

I claim:

1. In the polymerization of monoolefin hydrocarbons to produce polymers boiling predominately below about 400° F. wherein at least one monoolefin hydrocarbon containing from 3 to 4 carbon atoms is passed into a reaction zone and into contact with a solid acidic catalyst selected from the group consisting of solid phosphoric acid, cooper pyrophosphate, silica-alumina, alumina-boria, and silica-boria under elevated conditions of temperature and pressure whereby polymerization is effected, the improvement which comprises introducing into the reaction zone and into contact with said catalyst a liquid paraffin hydrocarbon having from 16 to 20 carbon atoms, which is at least partially in liquid phase, inert under the reaction conditions and a solvent for said polymers, the amount of said liquid paraffin hydrocarbon being in the range from about 10 to about 200 percent by weight of the monoolefin hydrocarbon introduced into the reaction zone and sufficient to maintain the activity of the catalyst in effecting polymerization and the pressure at which the polymerization is carried out being within the range from 100 to 400 p.s.i.g.

2. The method of claim 1 wherein said monoolefin hydrocarbon is propylene.

3. The method of claim 1 wherein said liquid paraffin hydrocarbon is cetane.

4. The method of claim 1 wherein the polymerization is effected at a temperature within the range from about 300 to about 450° F.

5. The method of claim 1 wherein the catalyst is phosphoric acid on kieselguhr.

References Cited by the Examiner

UNITED STATES PATENTS

| | | | |
|---|---|---|---|
| 2,051,859 | 8/1936 | Ipatieff et al. | 260—683.15 |
| 2,174,247 | 9/1939 | McAllister | 260—683.15 |
| 2,440,459 | 4/1948 | Bloch | 260—683.15 |
| 2,642,402 | 6/1953 | Corner et al. | 260—683.15 |
| 2,827,444 | 3/1958 | Cines | 260—683.15 X |
| 2,967,206 | 1/1961 | Stuart et al. | 260—683.15 |

PAUL M. COUGHLAN, *Primary Examiner.*

ALPHONSO D. SULLIVAN, *Examiner.*